3,582,295
GASOLINE ANTI-ICING
Lawrence J. Balash, Southfield, Mich., assignor to
Ethyl Corporation, New York, N.Y.
No Drawing. Filed Apr. 7, 1967, Ser. No. 629,086
Int. Cl. C10l 1/28
U.S. Cl. 44—63                                                 8 Claims

ABSTRACT OF THE DISCLOSURE

Gasoline containing, as an improved anti-icing additive, the combination of a substituted imidazoline, an amide or mixtures thereof and an organic silicon compound. Examples of the imidazoline and amide are 1-(2-hydroxyethyl)-2-heptadecenyl imidazoline and N(2-aminoethyl) - N - (2-hydroxyethyl)-oleylamide. Examples of suitable organic silicon compounds are polyhydrocarbylsiloxanes and alkyl silicates.

BACKGROUND OF THE INVENTION

The tendency of gasoline fueled internal combustion engines to stall due to carburetor icing is well known. This stalling contributes to reducing the overall efficiency of engine operation. Where the engine powers an automobile, it may also be a safety hazard.

Gasoline additives which will reduce this tendency of the carburetor to ice are available. New and improved anti-icing additives, however, are always in demand.

SUMMARY OF INVENTION

This invention relates to the synergistic interaction of an organic silicon compound and a substituted imidazoline or amide in gasoline to effect improved anti-icing characteristics. It further relates to a method of reducing the stalling due to ice formation in the carburetor of a gasoline fueled internal combustion engine. It also relates to a combination of an organic silicon compound and a substituted imidazoline, an amide or mixture thereof, as a new gasoline additive.

DESCRIPTION OF THE PREFERRED EMBODIMENT

An object of this invention is to provide a gasoline composition with improved anti-icing characteristics. Another object of this invention is to provide a new gasoline additive anti-icing composition. These and other objects of this invention will be made apparent from the following description and claims.

An embodiment of this invention is a gasoline containing as an anti-icing additive the combination of (a) an organic nitrogen compound selected from
   (i) imidazolines having the formula $$R_1-C \begin{array}{c} N-CH_2 \\ \diagup \\ \diagdown \\ N-CH_2 \\ | \\ R_2 \end{array}$$

(I)

and
(ii) amides having the formula $$R_1-C \begin{array}{c} O \\ \diagup\!\!\!\diagup \\ \diagdown \\ N-(CH_2)_2-N-R_2 \\ | \quad\quad\quad\quad | \\ H \quad\quad\quad\quad H \end{array}$$

(II)

and $$R_1-C \begin{array}{c} O \\ \diagup\!\!\!\diagup \\ \diagdown \\ N-(CH_2)_2-NH_2 \\ | \\ R_2 \end{array}$$

(III)

wherein $R_1$ is selected from alkyl and alkenyl radicals having up to 20 carbon atoms and $R_2$ is a radical selected from ethyl, 2-hydroxyethyl and 2-aminoethyl;

(iii) mixtures of (i) imidazolines and (ii) amides and (b) an organic silicon compound selected from the class consisting of silicones and silicates.

Another embodiment of this invention is the gasoline described above wherein the concentration of said organic nitrogen compound is from about 25 to about 50 parts per million and said organic silicon compound is from 5 to about 15 parts per million.

Preferred embodiments of this invention are gasolines described above wherein the organic silicon compounds are selected from (a) silicones having the formula $$L_1-\begin{bmatrix} L \\ | \\ Si-O \\ | \\ L \end{bmatrix}_y \begin{array}{c} L \\ | \\ Si-L_1 \\ | \\ L \end{array}$$

(IV)

wherein L is independently selected from $C_1$ to $C_{12}$ alkyl groups and $C_6$ to $C_{10}$ aryl groups and y is an integer from 1 to about 20 and $L_1$ is selected from L as defined above and the hydroxyl group and (b) silicates having the formula $$T-O-\underset{\underset{\underset{T_3}{|}}{\overset{\overset{T_1}{|}}{O}}}{Si}-O-T_2$$

(V)

wherein T, $T_1$, $T_2$, and $T_3$ are independently selected $C_1$ to $C_{12}$ alkyl groups. More preferred embodiments of this invention are gasolines described above wherein the organic silicon compound is a silicone having Formula IV wherein (1) L is methyl and y is 1 to about 5 and (2) L and $L_1$ are methyl and y is 1.

Especially preferred embodiments are the more preferred gasolines described above wherein said organic nitrogen compounds are mixtures of imidazolines (Formula I) and amides (Formulae II and III) wherein $R_1$ is a $C_{17}$ hydrocarbon alkyl radical and $R_2$ is 2-hydroxyethyl.

The organic nitrogen compounds which are useful in this invention are readily obtained by reacting a suitable organic acid with a polyamine. This reaction involves the elimination of water between the acid and the amine. When one molecule of water is split out, linear amides such as those represented by Formulae II and III are obtained; if the condensation is carried out so that two molecules of water are eliminated, the imidazolines having Formula I are obtained. Methods of preparing these imidazolines and amides are well known. Useful procedures are described in Wilson, U.S. 2,267,965; Wilkes, U.S. 2,214,152; and Barusch et al., U.S. 2,839,373.

Various acids and various amines may be used to prepare these imidazolines and amides. The imidazolines and amides therefore will be described in terms of the acids and amines used to prepare them.

Acids which are useful in the preparation of these organo-nitrogen compounds are carboxylic acids having up to about 20 carbon atoms. These examples of acids are acetic acid, eicosanoic acid, octanoic acid and the like. Preferred acids are unsaturated organic acids having from 10 to about 20 carbon atoms. The preferred acids are Δ9,10-decenoic acid, oleic acid, linoleic acid, gadoleic acid and the like.

The preferred acids are commonly obtained as hydrolysis products of natural materials. The acids so obtained are usually mixtures containing other organic acids. Thus, for example acids obtained from olive oil, typically are a mixture of about 83 percent oleic acid, 6 percent palmitic acid, 4 percent stearic acid and 7 percent linoleic acid. This mixture is quite suitable for preparing the organic nitrogen compounds used in this invention. In addition, the organic acid mixtures obtained on saponifying and acidulating babassu oil, castor oil, tall oil, peanut oil, palm oil, and the like, are also useful.

Another type of useful acid is that obtained when an unsaturated acid such as one of those described above is modified by reaction with formaldehyde under acid conditions. This reaction is commonly known as the Prins reaction. The reaction involves the addition of elements of formaldehyde and/or water across the double bond; the product obtained thus is a mixture of various addition products; the acid function is not affected. Thus, the Prins reaction produces a mixture of modified acids which can be used to prepare the organic nitrogen compounds of the present invention. The unsaturated acids which can be formaldehyde modified include all of the acids described above. This encompasses the mixtures of acids obtained from the natural products which contain at least some unsaturated acids. Thus, for example, the Prins reaction products of acids derived from coconut oil, tall oil, peanut oil and the like are useful.

The amines which can be used to prepare useful imidazolines and amides are ethylene diamine and N-substituted ethylene diamine. They are illustrated by the formula

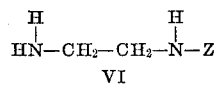

VI wherein Z is selected from hydrogen, 2-aminoethyl, 2-hydroxyethyl and alkyl or alkenyl groups having up to 20 carbon atoms. Examples of suitable amines are ethylenediamine, N-gadoleyl ethylenediamine, N-dodecylethylenediamine, N-pentadecen-7,8-yl, 1,2-ethylenediamine and the like. Preferred amines are N-(2-hydroxyethyl)ethylenediamine, diethylenetriamine and the like.

The organic silicon compounds which are used in this invention are silicones having Formula IV and the organic silicates having Formula V. The silicates are generally monomers. The silicates which are useful are the organosilicates wherein T in Formula V is a hydrocarbyl group having 1 to about 12 carbon atoms. The hydrocarbyl groups may be alkyl groups or aryl groups.

The alkyl silicates include those in which the alkyl groups are all the same as well as those in which the alkyl groups are different. Examples of the former silicates are propyl silicate, dodecyl silicate, hexyl silicate, t-butyl silicate, and the like; examples of the latter silicates (which will be referred to as mixed silicates) are diethyl-diisobutyl silicate, propyl-tripentyl silicate, ethyl-triisobutyl silicate and the like. These mixed silicates are generally a mixture of mixed silicates. Thus, for example, a mixed ethyl-tert-butyl silicate would contain all the possible ethyl-tert-isobutyl silicate combinations. These mixtures of mixed silicates are also useful in the practice of this invention.

A preferred silicate is ethyl silicate.

Silicones used in this invention are polyalkyl- and polyarylsiloxanes. These polysiloxanes are characterized in that the silcon atom is bound directly to a carbon atom in each of two hydrocarbyl radicals and to one oxygen atom which in turn is bound to a second silicon atom. The characteristic structure is illustrated by Formula IV above.

L in Formula IV represents alkyl groups such as methyl, hexyl, dodecyl and the like, aryl groups such as phenyl and the like and mixtures thereof. $L_1$, that is, the terminal group in these polysiloxanes, can be alkyl, aryl, hydroxyl, or ester. Silicones in which L and $L_1$ methyl are preferred. These preferred silicones are also called polymethylsiloxanes or -silicones. These polymethylsilicones vary in constancy from very low viscosity water-like fluids to thick grease-like materials. Although silicones having Formula IV are useful in general, the polymethylsiloxanes having a viscosity of from about 0.5 to about 100,000 centistokes are more preferred. Polymethylsilicone fluid having a viscosity of about 0.6 to about 1.5 centistokes is most preferred.

Another embodiment of this invention is an additive concentrate which comprises a mixture of organic silicon compounds and organic nitrogen compounds described above. This mixture is prepared by simply blending the two ingredients. These two ingredients may either be mutually soluble at the desired concentrations or they may not be. In the latter case, the mixture would have to be stirred prior to addition to the gasoline to insure homogeneity. On the other hand, a small amount of suitable solvent may be added to prepare a solution of the immiscible ingredients. Solvents which are useful are aromatic hydrocarbons such as toluene, xylene and the like; paraffinic hydrocarbons such as hexane, dodecane, pentadecane and the like; alcohols such as 2-ethylhexanol, pentanol, isopropanol, ethanol and the like. Commercial mixtures of solvents such as Stoddard solvent are also useful.

The ratio of the organonitrogen compound to organic silicon compound in the additive mixture may be varied. A suitable blend contains from about 60 to about 95 percent by weight of the organic nitrogen compound and from about 5 to about 40 percent of the organic silicon compound. Although the ratio of the ingredients in this mixture is not critical, the ratio must be such that when added to gasoline, the concentration or organic silicon and organic nitrogen compounds in the gasoline is within the range taught to be effective above.

Any gasoline suitable for use in internal combustion engines may be used in the practice of this invention. By gasoline is meant a blend of hydrocarbons boiling from about 25° C. to about 225° C. which occur naturally in petroleum and suitable hydrocarbons made by thermal or catalytic cracking or reforming of petroleum hydrocarbons. Typical base gasolines are listed in Table I.

TABLE I
Base Gasolines

| | A | B | C | D |
|---|---|---|---|---|
| Gravity, ° API | 59.9 | 56.6 | 62.0 | 39.7 |
| Reid vapor pressure, p.s.i. | 9.0 | 11.2 | 10.7 | 10.2 |
| Sulfur, percent | .013 | .007 | .054 | .050 |
| Aromatics, percent | 27.0 | 34.5 | 19.0 | 24.0 |
| Olefins, percent | 11.0 | 8.0 | 18.5 | 12.5 |
| Saturates, percent | 62.0 | 57.5 | 62.5 | 63.5 |
| ASTM distillation, ° F.: | | | | |
| Initial B.P. | 100 | 89 | 90 | 88 |
| 10% evaporation | 128 | 116 | 115 | 116 |
| 30% evaporation | 166 | 177 | 155 | 165 |
| 50% evaporation | 210 | 230 | 199 | 218 |
| 70% evaporation | 250 | 282 | 254 | 274 |
| 90% evaporation | 310 | 338 | 349 | 355 |
| End point | 396 | 410 | 420 | 432 |

In preparing the improved gasolines of the present invention, the organic silicon and organic nitrogen compounds may be conveniently added as concentrates described above. The gasoline compositions can also be prepared by simply adding the individual ingredients to the gasoline. Conventional gasoline blending procedures and apparatus can be used.

The improved anti-icing characteristics of the gasoline compositions of this invention were determined by using an automobile engine test. Briefly, the procedure consists of cycling an automobile engine with no load between medium and low speeds using cold moist carburetor intake air. When a sufficient amount of ice forms in the carburetor throttle plate and idle passages, stalling occurs during the low speed portion of the cycle. After the stall, the engine is immediately restarted on the medium speed portion of the cycle. Warm up of the engine is simulated by applying external heat to a specific section below the carburetor. The criteria for evaluating the icing tendency of a fuel is the number of stalls which occur before the warm up is accomplished. The data is reported as percent reduction in stalls using gasoline containing the additive as compared with gasoline containing no anti-icing additive. Following is a table presenting the anti-icing data for the gasoline fuels of this invention.

TABLE II
Anti-icing

| Example | Gasoline containing— | | Amount (p.p.m.) | Reduction in stalls, percent |
|---|---|---|---|---|
| | Organic nitrogen compound | Organic silicon compound | | |
| 1 | None | Dimethylsilicone [1] | 10 | 2 |
| 2 | Tall oil acid/N-2-hydroxyethylethylene diamine [2] | None | 25 | 57 |
| 3 | do | Plus dimethylsilicone [1] | 25+10 | 77 |

[1] Dow Corning DC-200, 100 cs. viscosity.
[2] Imidazoline prepared therefrom.

The data in Table II illustrates the unexpected improvement in anti-icing obtained using the additive mixtures of this invention. A small amount of silicone oil in gasoline (Example 1) has virtually no effect as an anti-icer. The imidazoline additive (Example 2) reduces the stalling by 57 percent. Quite unexpectedly however, the imidazoline plus the silicone oil reduces the stalling by 77 percent. This improved anti-stalling effect is quite clearly synergistic and not additive.

Similar anti-icing results are obtained when the following organic silicon and organic nitrogen mixtures are used in gasoline (Table III).

Useful concentrations of the organic nitrogen compounds in gasolines of this invention are up to about 200 p.p.m. by weight, with 10 to about 100 p.p.m. preferred; for the organic silicon compounds useful concentrations are up to about 100 p.p.m. by weight, with 1 to about 50 p.p.m. preferred.

TABLE III

| (A), organic nitrogen | (B), organic silicon | Concentration in gasoline (p.p.m.) [1] (A)/(B) |
|---|---|---|
| 2-heptadecenyl-1-(2-hydroxyethyl)imidazoline | Dimethylsilicone 60,000 cs.[2] | 50/5 |
| N-(2-aminoethyl)-N-(2-hydroxyethyl)gadoleylamide | Dimethylsilicone 0.6 cs.[2] | 200/2 |
| 2-dodecenyl-1-ethylimidazoline | Polydiphenylsilicone 10,000 cs | 100/10 |
| N,N-di-(2-aminoethyl)palmitoleylamide | Polydiphenylsilicone 100,000 cs | 10/1 |
| Imidazoline from peanut oil acids/triethylene diamine | Dodecylsilicate | 15/15 |
| N-(2-aminoethyl)-N-heptadecenyloleylamide | Ethylsilicate | 75/30 |
| Amides from oleic acid/ethylenediamine | tert-Butylethylsilicate [3] | 30/8 |

[1] By weight.
[2] Dow Corning DC-200 fluid.
[3] Mixture of the mixed silicates.

NOTE: Cs=Centistokes.

The gasoline compositions and additive concentrates of this invention may also contain other commonly used gasoline additives. Examples of other additives are antiknock agents such as tetraethyllead, tetramethyllead, methylcyclopentadienyl manganese tricarbonyl and the like; scavengers such as ethylene bromide, ethylene chloride and the like; antioxidants such as hindered phenols and aromatic amines; lead appreciators such as tert-butylacetate and the like; corrosion inhibitors such as linoleic acid dimer and the like; and dyes.

The gasoline compositions and gasoline additive mixtures of the present invention are fully described above. It is intended that the invention herein described be limited only within the lawful scope of the above disclosure and the claims which follow.

What is claimed is:

1. Gasoline containing as an anti-icing additive the combination of (a) from about 25 to about 50 parts per million selected from (i) imidazolines having the formula $$R_1-C\begin{array}{c}N-CH_2\\ \| \\ N-CH_2\\ |\\ R_2\end{array}$$

and (ii) amides having the formulas $$R_1-C\begin{array}{c}O\\ \| \\ \\ N-(CH_2)_2-N-R_2\\ H \quad\quad\quad H\end{array}$$

and $$R_1-C\begin{array}{c}O\\ \| \\ \\ N-(CH_2)_2-NH_2\\ |\\ R_2\end{array}$$

wherein $R_1$ is selected from alkyl and alkenyl radicals having up to 20 carbon atoms and $R_2$ is a radical selected from ethyl, 2-hydroxyethyl and 2-aminoethyl;

(iii) mixtures of (i) imidazolines and (ii) amides and (b) from 5 to about 15 parts per million by weight of a silicone having the formula $$Li-\left[\begin{array}{c}L\\ |\\ Si-O\\ |\\ L\end{array}\right]_y\begin{array}{c}L\\ |\\ Si-L_1\\ |\\ L\end{array}$$

wherein L is independently selected from $C_1$ to $C_{12}$ alkyl groups and $C_6$ to $C_{10}$ aryl groups and $y$ is an integer from 1 to about 20 and $L_1$ is selected from L as defined above and the hydroxyl group.

2. The gasoline of claim 1 wherein L and $L_1$ are methyl and $y$ is 1 to about 5.

3. The gasoline of claim 1 wherein L and $L_1$ are methyl and $y$ is 1.

4. The gasoline of claim 1 wherein the said organic nitrogen compound is a mixture of said imidazoline and amide wherein $R_1$ is a $C_{17}$ alkenyl radical and $R_2$ is 2-hydroxyethyl.

5. A gasoline additive composition comprising from about 60 to about 90 percent by weight of the organic nitrogen compound of claim 1 and from about 5 to about 40 percent by weight of the silicone of claim 1.

6. The gasoline of claim 2 wherein said organic nitrogen compound is a mixture of said imidazoline and amide wherein $R_1$ is a $C_{17}$ alkenyl radical and $R_2$ is 2-hydroxyethyl.

7. The gasoline of claim 3 wherein said organic nitrogen compound is a mixture of said imidazoline and amide wherein $R_1$ is a $C_{17}$ alkenyl radical and $R_2$ is 2-hydroxyethyl.

8. Gasoline containing about 10 parts per million by weight of a dimethylsilicone having a viscosity of 100 centistokes and about 25 parts per million by weight of an imidazoline prepared from tall oil acid and N-(2-hydroxyethyl)ethylene diamine.

References Cited

UNITED STATES PATENTS

| | | | |
|---|---|---|---|
| 2,267,965 | 12/1941 | Wilson | 260—309.6 |
| 2,706,677 | 4/1955 | Duncan et al. | 44—63 |
| 2,974,022 | 3/1961 | Lindstrom et al. | 44—56D |
| 3,033,664 | 5/1962 | Pethrick et al. | 44—63 |
| 3,036,902 | 5/1962 | Hamer et al. | 44—63 |
| 3,063,818 | 11/1963 | Sutton et al. | 44—76 |
| 2,765,221 | 10/1956 | Lusebrink et al. | 44—76 |
| 2,809,617 | 10/1957 | Bartleson et al | 44—76 |
| 2,862,885 | 12/1958 | Nelson et al. | 44—76 |
| 2,986,874 | 6/1961 | George | 44—76 |

DANIEL E. WYMAN, Primary Examiner

Y. H. SMITH, Assistant Examiner

U.S. Cl. X.R.

44—71, 76, Dig. 1